(12) United States Patent
Yushkov et al.

(10) Patent No.: US 7,561,048 B2
(45) Date of Patent: Jul. 14, 2009

(54) METHODS AND SYSTEM FOR REDUCED ATTENUATION IN TRACKING OBJECTS USING RF TECHNOLOGY

(75) Inventors: Andrey Yushkov, Novosibirsk (RU); Alexey Talyshev, Novosibirsk (RU); Felix Markhovsky, San Jose, CA (US)

(73) Assignee: Invisitrack, Inc., Annapolis, MD (US)

( * ) Notice: Subject to any disclaimer, the term of this patent is extended or adjusted under 35 U.S.C. 154(b) by 130 days.

(21) Appl. No.: 11/610,595

(22) Filed: Dec. 14, 2006

(65) Prior Publication Data

US 2007/0139200 A1    Jun. 21, 2007

Related U.S. Application Data

(60) Provisional application No. 60/597,649, filed on Dec. 15, 2005.

(51) Int. Cl.
  *G08B 13/14* (2006.01)
(52) U.S. Cl. .................. 340/572.1; 340/541; 702/158; 342/47; 455/425
(58) Field of Classification Search .............. 340/572.1, 340/539.13, 825.49, 568.1, 541, 573.1; 342/47, 342/204; 702/158; 455/425, 560
See application file for complete search history.

(56) References Cited

U.S. PATENT DOCUMENTS

| | | | | |
|---|---|---|---|---|
| 4,455,556 A | * | 6/1984 | Koshio et al. ................ | 342/47 |
| 5,774,876 A | * | 6/1998 | Woolley et al. ............... | 705/28 |
| 6,211,818 B1 | * | 4/2001 | Zach, Sr. ............... | 342/357.07 |
| 6,435,286 B1 | * | 8/2002 | Stump et al. .................. | 175/26 |
| 6,788,199 B2 | * | 9/2004 | Crabtree et al. ........ | 340/539.13 |
| 6,812,824 B1 | * | 11/2004 | Goldinger et al. .......... | 340/10.1 |
| 2004/0021599 A1 | * | 2/2004 | Hall et al. ..................... | 342/28 |
| 2006/0145853 A1 | * | 7/2006 | Richards et al. .......... | 340/572.1 |
| 2006/0220851 A1 | * | 10/2006 | Wisherd ................... | 340/568.1 |
| 2007/0248180 A1 | * | 10/2007 | Bowman et al. ............ | 375/272 |

* cited by examiner

*Primary Examiner*—Davetta W Goins
*Assistant Examiner*—Edny Labbees
(74) *Attorney, Agent, or Firm*—Bardmesser Law Group

(57) ABSTRACT

A method and system for a Radio Frequency (RF)-based identification, tracking and locating of objects. The method and system use a narrow bandwidth signal in VHF of lower frequency range, which minimizes propagation loss and loss of accuracy of the RF locating signals. The signal is sent from a Master Unit(s) to a Tag. The signal traveling time is recorded and the distance between the Master(s) and the Tag is calculated. The method and system allow achieving a longer distance of the RF signal penetration and an increased accuracy by using VHF bands. The techniques of Digital Signal Processing and Software-Defined Radio are used. The actual waveforms transmitted and received by the radios are defined by the software. The roles of the Master Unit(s) and the Tag can be reversed.

19 Claims, 5 Drawing Sheets

METHODS AND SYSTEM FOR REDUCED ATTENUATION IN TRACKING OBJECTS USING RF TECHNOLOGY

CROSS REFERENCE TO RELATED APPLICATIONS

This application claims priority of U.S. provisional Patent Application No. 60/597,649 filed on Dec. 15, 2005, entitled METHOD AND SYSTEM FOR REDUCED ATTENUATION IN TRACKING OBJECTS USING MULTI-BAND RF TECHNOLOGY, which is incorporated by reference herein in its entirety.

BACKGROUND OF THE INVENTION

1. Field of the Invention

The present invention relates to method and system for a Radio Frequency (RF)-based identification, tracking and locating of objects.

2. Background of the Related Art

RF-based identification and location-finding systems for determination of relative or geographic position of objects are generally used for tracking single objects or groups of objects, as well as for tracking individuals. Conventional location-finding systems have been used for position determination in the open outdoor environment. RF-based, Global Positioning System (GPS), and assisted GPSs are typically used. However, conventional location-finding systems operate in the UHF band and suffer from certain inaccuracies when locating the objects in closed environments, as well as outdoors.

The indoor and outdoor location inaccuracies are due mainly to the physics of RF propagation, in particular, due to losses/attenuation of the RF signals, scattering and reflections. Accordingly, there is a need for a method and a system for object identification and location-finding, which is accurate in both indoor and outdoor environments.

Conventional identification and tracking-location systems have not used the narrow bandwidth signals for accurate RF tracking and locating. Previous developments have taught away from using such narrow bandwidth signals for RF identification, tracking and location of objects. The narrow bandwidth signals have been deemed impractical because accurate identification and location of objects requires extremely accurate distance measurements. The distance measurements are used in triangulation/trilateration or virtual triangulation calculations.

Conventional systems are restricted to single offices for point-to-point communications. By way of further example, a hospital building is full of various metal objects, including medical equipment in metal enclosures, metal cabinets, tables, or the like. If a 900 MHz RF signal is transmitted in this type of space, the RF wavelength is only 30 cm, and since most of these objects are significantly larger than 30 cm, a large portion of the RF energy will be reflected. Also, at 900 MHz, the RF energy will be significantly attenuated as the signal passes through internal walls or building floors, reducing the operating range. These indoor effects make signals at 900 MHz (or higher) frequencies ineffective in object locating in any reasonably complex indoor environment due to the RF signal losses caused by the potential reflectors and the signal losses through the walls.

A wireless RF-based system is subjected to "free space" losses associated with the attenuation of the signal. In addition to the "free space" losses, other propagation losses in real-world RF-based systems include reflection, scattering, diffraction, shadowing, refraction, and absorption. The limitation of using UHF high frequencies is that they are highly attenuated in passing through walls (See, e.g. http://www.stanford.edu/class/ee359/lecture2.pdf) and are scattered or absorbed by conductive and non-conductive objects.

The UHF high frequencies attenuation is caused by the small wavelengths as compared to objects normally found in buildings and in an urban environment. Therefore, higher frequency (UHF) RF tracking and locating systems are limited to operating in two regimes. The first regime, used primarily by GPS, is effective in the open space where direct unobstructed line of sight to three or more satellites broadcasting the signals can be established. This allows for good triangulation and object location. However, it does not work as well in closed environments, such as urban corridors, forested land, canyons and adverse weather conditions. This regime does not work inside buildings.

The second regime is active RFID, which is sometimes used for location within buildings. However, the attenuation and scattering of the signals limits the operating range to a hundred feet. An active RFID reader in each room may be required. As the operating distance increases between the master unit/reader and a slave unit/tag, there is more reflection, scattering and attenuation of the direct path RF signal energy. This decreases the power ratio between the Direct Line of Sight (DLOS) signal, and all other indirect path signals.

On the other hand, increasing the power of the transmitted signal does not solve the "free space" loss and other propagation loss problems. While higher transmitted signal power increases the RF link budget and consequently the operating range, it does not affect the propagation of the RF signal energy. The higher transmitted signal power causes more reflection, scattering and attenuation of the direct path RF signal energy. The power of all indirect path signals also increases proportionally. Thus, increasing the transmitted signal power does not extend the operating range without reducing the accuracy.

Existing RFTL (RF Track-Locate) systems almost all make use of "active RFID" technology or "GPS" technology. In either case, they operate in the UHF band of radio frequencies, defined as those between 300 and 3000 MHz.

At these relatively high radio frequency bands, temporally narrow (i.e., a very short pulse) ranging signals can be sent from the Master unit to the slave tags or between the slave tags. These signals are relatively unambiguous in shape when they are received, and that allows well-defined TOA (Time-Of-Arrival) and DTOA (Differential Time-Of-Arrival) measurements and hence, relatively accurate time and distance measurements to be made.

Thus, ranging accuracy is usually thought to depend on a very short duration RF pulse. It is well-understood from Fourier analysis that an RF pulse is composed of very many frequency components. The sharper or narrower in time the pulse is, the more frequency components it has; it is thus described as "broadband" or having "broad-bandwidth". This broadband signal is usually only permitted in the UHF or higher frequency bands where more unused bandwidth is available.

However, the use of higher RF frequencies introduces other problems. More specifically, it is well-known that such signals are heavily attenuated or absorbed by many materials, including ordinary walls of buildings. For this reason, GPS-based RFTL systems are limited to use out of doors. Similarly active RFID-based RFTL systems, when used in a building have very limited range (up to 100 feet or 200 feet), because of absorption or attenuation in the walls of a room. This means that an RFTL system used to locate people or objects in a building needs multiple fixed readers (or master units), perhaps as many as one in each room, thereby increasing its inherent expense.

Further, even when the higher frequency RF ranging signals are not absorbed, they are prone to being scattered by metallic and non-metallic objects in their path. This leads to a plethora of different ranging signals arriving at the slave tag (or back to the Master unit) at slightly different times from an unscattered or direct signal; this is manifested as noise in the received ranging signal and is analogous to the "ghosts" that were seen with early television signals.

Accurate distance measurement is determined by accurate measurement of the transit time of an RF ranging signal (from a satellite to a GPS receiver, or from an active RFID reader to a tag, and back to the reader). An accurate distance measurement can be achieved with a narrowest possible ranging signal. The reason for the narrow bandwidth signals not having been used in conventional systems is that, the narrower is the RF signal band, the broader the signal temporally. Also, VHF band locating signals have not been developed, in part, because of the governmental agency spectrum restrictions, such as, for example, Federal Communication Commission (FCC) requirements. The FCC has limited signals in the VHF and the lower frequency bands to very narrow bandwidths (less than 30 KHz).

As a result, there is a need in the art for a method and system for object identification and location-finding, which uses narrow bandwidth signals in VHF or lower frequencies. There is also a need for a method and system for object identification and location-finding that is effective when only two devices (Master and target) are present in the environment, or when a signal, such as a GPS signal, cannot be received, for example, inside a mall, urban canyons, etc.

SUMMARY OF THE INVENTION

The present invention relates to method and system for a Radio Frequency (RF)-based identification, tracking and locating of objects. The proposed method and system uses a narrow bandwidth signal, such as VHF or lower frequencies, which minimizes propagation loss and loss of accuracy of the RF locating signals. Digital signal processing can be used. The present invention can use software implemented digital signal processing and software defined radio technologies.

The system of the present invention can be constructed using standard FPGAs and standard signal processing hardware and software at a very small incremental cost to the device and overall system. Thus, an inexpensive and highly accurate object identification and tracking device can be provided. The system can include a management station having the software for controlling a network of the object tracking and locating units. The software can be installed on a computer system.

The transmitters and receivers for narrow bandwidth signal (for example, VHF or lower frequencies) are used to identify a location of a person or object. Digital signal processing (DSP) and software defined radio (SDR) technologies can be used to generate, receive and process a narrow bandwidth signal. The narrow bandwidth signal is used to identify, locate and track a person or an object in a half-duplex or simplex mode of operation.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
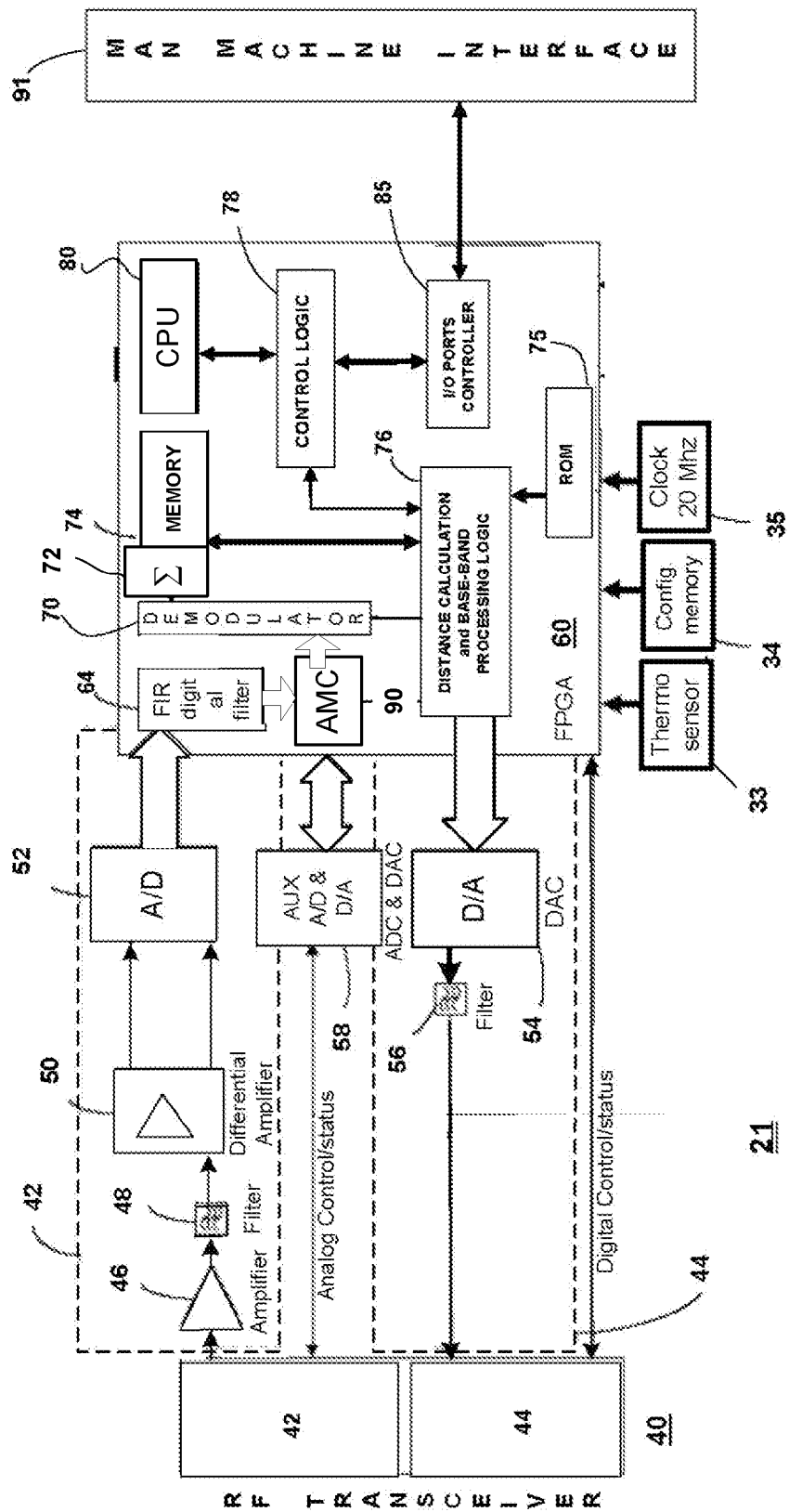
FIG. 1 is a block diagram of a master unit of an RF mobile tracking and locating system.

Reference will now be made in detail to the preferred embodiments of the present invention, examples of which are illustrated in the accompanying drawings.

The present invention relates to method and system for RF-based identification, tracking and locating of objects. The method and system of the present invention uses a narrow bandwidth signal, such as VHF of lower frequencies, which minimizes propagation loss and loss of accuracy of the RF signals. Using a ranging signal in the low RF frequencies with narrow bandwidth increases the accuracy of tracking and the operating range of the tracking and location system.

Narrow bandwidth ranging signal(s) provides for longer ranges than existing ranging techniques given the same power. It is also less susceptible to multipath interference and attenuation.

Narrow band ranging can be used thanks to the following three techniques. The preferred embodiment uses all three:

(1) A technique that improves signal to noise ratio—e.g., Coherent/Non-coherent+summing, (2) Loop Back (calibration).

(3) Base Band Processing (digitizing of radio signal using DSP and SDR), including any of: IF filtering, programmable modulator, demodulator, and adaptive equalization for multipath rejection.

The narrowband signals can be used in conjunction with Sequential spectrum techniques (coherent), and spread spectrum, spread signal A radio-frequency tracking and location (RFTL) system is provided that can locate and track multiple "slave" tags (attached to people or objects) relative to a "Master unit" without the need for any significant fixed infrastructure. Further, the system can provide distance measurement between two devices with reasonably high accuracy (e.g., within 10 feet), range (e.g., up to 1500 feet), and to be able to do this in complex environments, including use indoors and out-of-doors. This enables the overall system (that has multiple tags) to provide location information for large geographic areas.

Accurate location can be obtained by using algorithms for trilateration or triangulation provided accurate distance measurements can be made between the Master unit and multiple slave tags and among the slave tags.

It is well known that, because the speed of propagation of RF waves is a constant in air, accurate measurement of these distances can be obtained by accurately measuring the propagation time of an RF "ranging" signal from one tag to a second tag (or, as is more commonly done, by measuring the propagation time of the ranging from the master unit to a tag and then back from the tag to the originating master unit).

Calculating these propagation times with well-known techniques known as "time of arrival" (TOA) or "differential time of arrival" (DTOA) then allow one to locate and track a given slave tag relative to a Master unit.

The approach described herein that can be used in complex environment, including space inside and outside of buildings and having a range of up to 1500 feet between each of the devices at low power requirements, even in buildings, it is necessary to work at lower RF frequencies such as the VHF band (defined as between 30 MHz and 300 MHz), where attenuation and scattering are greatly reduced.

The major problem introduced by working in the VHF is that the band is quite narrow compared to the UHF band and that narrowness is made even more restrictive by FCC regulations, which allocate different narrow bandwidths, including 6.25 KHz, 11.25 KHz, 12.5 KHz, 25 KHz per channel.

This means that any ranging signal in the VHF must be extremely narrow-band and therefore relatively extended temporally. This makes the unambiguous identification of the time of arrival of (for example, the peak of) a ranging pulse more difficult, particularly if the pulse suffers some distortion due to noise, scattering and attenuation as it propagates. This distortion is often quantified as a reduction in the signal to noise ratio ("SNR") of the ranging pulse.

The present approach employs very narrow-bandwidth ranging signals in the VHF band or lower in order to permit a relatively long-range, accurate RFTL (Radio Frequency Tracking and Location) system to work in complex (indoor and outdoor) environments.

However, the use of such narrow-bandwidth ranging signals normally requires several things. The first is to utilize a technique such as coherent/noncoherent summation, to reduce the ambiguity of the arrival time of the ranging signal by improving the SNR. Specifically, each TOA or DTOA measurement is based on the measurement of multiple (for example, 100) sequential ranging pulses, and the electronic adding or averaging of these pulses. The effect of this averaging multiple pulses (e.g., N pulses) subject to white noise and random distortions, will be to improve the SNR of the received signal by the $\sqrt{N}$.

An enhanced ranging signal received at the slave tag (or received back at the Master unit) allows the time of arrival of a narrow band VHF ranging signal to be measured with as much precision as a broad band ranging signal in the UHF or microwave bands. This, in turn, allows the possibility of highly accurate location with a VHF-based RFTL system. This averaging can be done using an analog ranging signals, or, more conveniently, using a digitized form of the ranging signal. The coherent/noncoherent summation of signals to enhance the signal to noise ratio not previously been applied to the field of RF tracking and location.

In a practical RFTL system, the propagation time is measured by receiving the ranging signal at (e.g., the tag), and comparing its time of arrival to the time when the ranging signal was sent out from the Master unit. Therefore, what is actually measured is a total "flight" time, $T_{FL}$, given by:

$$T_{RoundTrip} = 2 \times T_{FL} + T_{DS},$$

where $T_{DS}$ is the delay of the ranging signal in traveling through the slave tag and being resent to the Master unit. Therefore, in order to know the propagation time $T_{FL}$, one must accurately know $T_{DS}$.

In any transceiver, such as in the Master unit or in the slave tag, an RF and/or IF band filter must be employed in the receiver to discriminate between the desired ranging signal and any extraneous RF signals. This filter or filters then determine the bandwidth of the receiver electronics. However, the delay in an electronic circuit is inversely proportional to the width of the passband of the circuit.

In conventional RFTL systems, operating in UHF or microwave bands, the signal bandwidth is large and the filter passband will be commensurately broad. Hence, the introduced delay in the circuit, $T_{DS}$, will be small and any variations in $T_{DS}$ also will be small, and will introduce small errors into the measurement of $T_{FL}$.

However, the system described herein uses a very narrow-bandwidth ranging signal, and the receiver must have narrow-bandwidth filters to reduce noise in the received signal and to discriminate against other signals that can be closely positioned in the VHF and lower bands (25 kHz and less). Thus the $T_{DS}$ will be large; this is acceptable provided the value of $T_{DS}$ is stable and variations in it are small enough to not produce a significant variation in $T_{FL}$. By calculation, as well as empirically, however, is the inventors found that variations in $T_{DS}$ introduced by variations in factors such as ambient temperature, operating voltage and signal strength, are sufficient to introduce significant errors in the measurement of $T_{FL}$, and hence create unacceptable errors in location determination.

Fortunately, propagation of a digitized signal in an electronic circuit is insensitive to any variations in components or ambient conditions. Thus, by digitizing the received ranging signal inside the receiver and processing the ranging signals in the digital domain, a fixed $T_{DS}$ can be maintained and accurate measurements can be made.

The analog to digital conversion is implemented in the IF or intermediate frequency section of the RF receiver, after the analog ranging signal passes through the antenna, is amplified and down converted to IF. Further processing is done using digital signal processing. An ancillary benefit of doing the processing of the ranging signal in digital form is that it allows a variety of signal processing techniques to be used. For example, error correction can improve sensitivity and one can use algorithms to minimize the effects of multi-path or scattering of the ranging signal as it propagates.

Finally a "Loop-Back" technique is employed to provide real-time calibration of the receiver propagation delay in the analog portion of the circuit.

The present invention can use standard system components operating at multiple frequency ranges (bands) for digital signal processing of a narrow bandwidth ranging signal. The software for digital signal processing and software-defined radio can be used. The signal processing software combined with minimal hardware, allows assembling the radios having transmitted and received waveforms defined by the software.

The longer RF waves have significantly lower propagation losses. Such radio waves have lower direct line-of-sight (DLOS) attenuation and are much less susceptible to scattering and reflections. Therefore, by employing lower frequencies for ranging signal, the present invention significantly increases the operating range of location-finding without compromising the accuracy.

According to the present invention, lower frequencies (below 900 MHz) are effective for tracking and locating objects in, for example, a hospital environment. The 150 MHz RF signal with a wavelength of approximately 2 meters is larger than majority of the objects in the hospital. Moreover, 150 MHz RF signal with a wavelength of approximately 2 meters is less attenuated by the internal walls or floors of the hospital building. (See http://fire.nist.gov/bfrlpubs/build97/PDF/b97123.pdf.)

Typically tracking and location systems employ what is known Track-Locate-Navigate methods. These methods include Time-Of-Arrival (TOA), Differential-Time-Of-Arrival (DTOA) and combination of TOA and DTOA. Time-Of-Arrival (TOA) as the distance measurement technique is generally described in U.S. Pat. No. 5,525,967. In any TOA-based system, the accuracy or resolution of the distance measurement is determined by the error in the estimated time-delay. The present invention advantageously uses narrow bandwidths (e.g., below 1% of the carrier frequency, and often as low as 2.5 KHz or even lower) and a ranging signal and reply signal techniques to calculate the time of delay estimate. It is an improvement over a conventional TOA or DTOA distance measurement.

The present invention provides a solution for identification, locating and tracking system using narrow bandwidth with lower frequency bands having longer wavelength (typically in the VHF band). The proposed method and system allow achieving a longer distance of the signal penetration and an increased accuracy by using VHF bands. Digital signal processing (DSP) and SDR (software-defined radio) can be used. Thus, the actual waveforms transmitted and received by the radios are defined by the software.

Processing of a narrow bandwidth ranging signal can use all types of signal modulation including, but not limited to AM, FM, PM (Phase Modulation), OFDM (Orthogonal Frequency Division Modulation), QAM (Quadrature Amplitude Modulation), etc.

Various modulation techniques can be applied to a narrow bandwidth ranging signal, for example Spread Spectrum techniques such as DSS (Direct Spread Spectrum) and FH (Frequency Hopping). The demodulation techniques applied to a narrow bandwidth ranging signal can include, but are not limited to coherent and non-coherent demodulation, zero-crossing demodulation, and quadrature demodulation.

Additionally noise reduction methods used with a narrow bandwidth ranging signal can include, but are not limited to, coherent/noncoherent summing, non summing, Matched Filtering, Inter-pulse Modulation (also known as Zero/Pi modulation), and dithering, etc. The interference reduction algorithms can include, for example, CMA (Constant Modulo Algorithm), DFE (Decision Feedback Equalization), Viterbi Algorithm and Kalman Algorithm. Included, is the ability to operate on several channels at different frequencies which provides additional information that can be used to further reduce the multi-path influence on the distance measurements.

The use of a narrow bandwidth ranging signal requires that the signal propagation delay through RF Transceiver/Transponders circuitry does not depend on the external parameters such as temperature, signal strength, time, etc. It is also required that propagation through RF Transceiver/Transponders and the FPGA circuitry can be measured.

In the present invention this can be accomplished by implementing various "Loopback" measurements through the above-mentioned circuits. In the "Loopback" mode, the transmitted ranging signal is fed back to a receiver (i.e. received at the same time). As a result, the signal time-of-flight becomes the measure of the propagation delay through the RF Transceiver/Transponders and the FPGA circuitry. It is not always possible to sufficiently recreate the necessary parameters of the environment (such as, for example, the incoming ranging signal strength). In this case, factory or field calibration tables (stored in the device memory) can be used to interpolate the value of "Loopback" measured propagation delay.

The present invention can be used as a simplex or a half-duplex system, in which the reader (often referred to as the "master") and the tags (sometimes also referred to as "slaves" or "targets") are controlled by a protocol that only allows the master or the slave to transmit at any given time. This alternation of sending and receiving allows a single frequency to be used in distance measurement. Such an arrangement reduces the costs and complexity of the system in comparison with full duplex systems. The typical duplex systems use two frequencies, as the number of masters and tags increase so does the complexity of the system and its communication protocols. It is also found that using two frequencies in the distance measurement imposes some limitation on the operating range.

Time Of Arrival (TOA) method of distance measurement, discussed above, can be used. When implementing TOA method of distance measurement it is necessary to track the signal propagation delay with the accuracy being within 10 ns. The variations in signal propagation delays can be caused by the device circuitry sensitive to ambient temperature, signal strength, supply voltage and the like. The Software Defined Radio (SDR) and Digital Signal Processing (DSP) is used. Thus, the actual waveforms of the RF signals transmitted are defined by the software.

The SDR/DSP hardware uses digital filtering and digital modulators/demodulators in conjunction with the RF front-end analog circuitry propagation delay measurement circuits. The SDR/DSP hardware includes self-testing capabilities for some of the RF front-end circuits. It also provides the propagation delay estimates of other circuits by measuring the components temperature, voltage and signal strength. The SDR/DSP implementation of the present invention eliminates the temperature and signal strength dependency within the SDR/DSP system dynamic range.

A higher bandwidth of the ranging signal can improve the TOA distance measurement resolution (accuracy) because the time-delay error becomes smaller. Also, a higher Signal-to-Noise Ratio (SNR) of the ranging signal results in a lower time-delay error. Thus, the present invention improves the TOA distance measurement resolution (accuracy) while keeping the ranging signal bandwidth low.

For improving the overall SNR, it is necessary to synchronously average out the values of the returned ranging signal samples (pulses) over a number of consecutively generated ranging signals. As the number of such consecutive ranging signals (and samples) increases, the SNR improves, resulting in an increased accuracy of the distance measurement.

Another approach is to determine the time delay estimate for every returned ranging signal, for example, using matching filter techniques. Then the time delay estimates values obtained over a number of consecutive ranging signals are averaged out. The matching filter delay estimate is the signal time origin that maximizes the matched filter's output.

The above described methods are implemented by Digital Signal Processing (DSP) technology, used to generate the actual waveforms of the RF signals transmitted and process the received signals. Moreover, it is inefficient to implement these methods using analog technology.

The tracking system of the present invention accounts for possible clock timing differences between devices (Master to tag, or Master to Master, or tag to Master to master). These differences are determined through a periodical calibration process performed by the system and initiated by the user or automatically under the SW control.

For calibration, the system, in response to each ranging signal sent by the initiating device (Master unit/reader) to the other device (slave unit/tag), sends two consecutive identical ranging signals separated by a predetermined time (clock count) $T_D$. After processing these two signals by a standard method used to determine the TOA during distance measurement, the initiating device (master) will determine the $T_D$ value in its own clock count. Then the clock counts ratio determines the clock timing difference between the devices.

In some instances multiple master units/readers need to find the distance to a slave unit/tag in order to determine its coordinates relative to these master units/readers. However, this process takes too long if each reader independently polls the tag in order to determine the distance. It is necessary to reduce the time required for distance determination between multiple readers and the tag. For that, the following method is used. One of multiple masters becomes the originating master, which operates in the "single originating master" mode. The rest of the masters are operating in the satellite mode:

(a) The RF transceiver of each of the satellite masters is switched to "receive" mode.

(b) Each satellite master will receive two ranging signals sequences: one that is generated by the originating Master unit and the one that is re-transmitted by the tag (c) Each ranging signal sequence is processed separately by a standard method used to determine the TOA during distance measurement (using the same procedure as in the originating Master).

(d) After the ranging signals processing is completed, the satellite master calculates the time of flight (delay time) for each ranging signal. The difference between the delay times of the two signals can be used to determine the tag position relative to the originating master and the satellite Masters.

(e) The originating Master performs standard reader-tag or reader-reader distance measurement operation.

(f) The clock timing difference among all of the devices is calculated in advance for implementation of the described method.

Further reduction of time required for position determination of multiple tags and readers can be achieved using DTOA locating method. For that, one of multiple masters becomes the originating master, which operates in the "single originating master" mode. The rest of the masters are operating under control of the originating master:

(a) The RF transceiver of each of the tags is switched to "receive" mode.

(b) Each tag will receive two ranging signals sequences that are generated by a DTOA pair of satellite masters or a DTOA pair that consists of the originating Master and a satellite master (in each pair one of satellite masters is acting as a tag).

(c) Inside the tag, each ranging signal sequence is processed separately by a standard method used to determine the TOA during distance measurement (using the same procedure as in the originating Master).

(d) After the ranging signals' processing is completed, the tag calculates the time of flight (delay time) for each ranging signal. The difference between the delay times of the two signals from each DTOA pair is sent to the originating master and is used to determine the tag position relative to the originating master and the satellite masters.

(e) In each DTOA pair, the Master performs standard reader-tag distance measurement operation.

(f) The clock timing difference among all of the devices is calculated in advance for implementation of the described method.

The wireless RF-based tracking and locating system can have a searching master unit with an operating range R. The RF link budget defines the system operating range R and the power ratio between the Direct Line of Sight (DLOS) signal and all other indirect paths signals defines an RF-based system performance. For RF wireless network systems, a poor power ratio results in lower data throughput, and in RF tracking and location systems such condition introduces substantial position errors. (See: http://www.wpi.edu/Pubs/ETA/Available/etd-0430104121009/unrestricted/alsindi.pdf). The RF tracking and locating system of the present invention can work in any open or closed environment including, for example, inside a large building with many rooms. The system operates at low frequencies such as VHF or below. Thus, the RF wavelengths are longer than dimensions of any typical reflecting object. Also, there is less scattering and attenuation in passing through walls. The power ratio between the Direct Line of Site (DLOS) signal and all other indirect path signals is greatly improved. Thus, any allowable increase in the transmitted power can be used to further extend the operating range without decrease in accuracy of distance measurement.

Specifically, the longer the RF wavelength (or the lower the operating frequency), the less pronounced are the real-world RF propagation effects, including losses, because:

(1) absorption and attenuation of the RF signal as it passes through walls or other barriers, at lower frequencies, is less that at higher frequencies;

(2) reflection, shadowing and other RF propagation effects are significantly reduced when obstacles are smaller than an RF wavelength to a degree that obstacles have little or no interaction with the RF wave. Thus, the RF signal simply bypasses these objects without significant attenuation, scattering, and reflection. (See Dan Dobkin "Indoor Propagation and Wavelength," WJ Communications, V 1.4, Jul. 10, 2002).

One advantage of lower frequencies is lower absorption and attenuation of the RF signal as it passes through walls or other barriers. Large-scale variations in received RF signal strength are highly dependent on the frequency of operation. (See S. E. Alexander and G. Puglies, "Cordless Communication Within Buildings: results of measurements at 900 MHz and 60 GHz," British Telecom Technology Journal, 1(1):99-105, July 1983).

The tracking and locating system of the present invention uses the increased operating range that is possible at longer wavelengths, i.e., at lower operating frequencies. The empirical estimates of the operating ranges are obtained from the following two studies:

1) http://www.invivoresearch.com/arti_use_autonet_wireless.html, and 2) http://www.rauma.tut.fi/projects/Kilavi/publication_files/Ali-Rantala.pdf Item 1 above describes the operating ranges of different wireless patient monitors were compared in hospitals, where the monitors were operated: (1) in the VHF band (164 MHz-216 MHz); (2) in the UHF band (902 MHz-928 MHz); and (3) at higher frequencies at 2.4 GHz. The higher-frequency 2.4 GHz monitors could not match the penetration capabilities of the VHF monitors and were not acceptable. Similarly, while the 900 MHz monitors achieved the same operating range as the VHF systems, such 900 MHz monitors required excessive transmitted signal power as they had to generate a signal of an up to 100 times greater power.

Accordingly, by using the results of those experiments, and inputting them into the Simplified Path Loss Model, see http://sahandkntu.ac.ir/~kmpour/part2. doc?bcsi_scan_72FFC7016F6A94A4=0&bcsi_scan_filename=part2.doc), and into the indoor Path Loss Scatter Model, see http://www.sss-mag.com/indoor.html#tutorial, the locating and finding process can be proven effective. For example, at 900 MHz the maximum operating range is 100 meters and deduces a path loss exponentiation factor of n=4.

Using the same model, it is found that at VHF frequencies (about 200 MHz), the path loss exponentiation factor n is reduced by a factor of approximately 1.3 and that, at the same power levels as the 900 MHz system, the operating range of the VHF monitors will be 400 meters.

The techniques of the present invention are further proven effective by using the data from the second study (Indoor Path Loss Scatter Model above), which considered RF transmission inside an apartment, and comparing 2.45 GHz and 433 MHz systems. In this study, transmitters were positioned in such a way that the field strength at any location in the apartment was to be at least 50 dB/m. All other conditions (transmitter power, transmitter height from the floor, etc.) were identical. The study found that it took five 2.45 GHz transmitters to cover the whole apartment, while a single properly-placed 433 MHz transmitter was able to satisfy or nearly satisfy the requirements.

The wireless RF-based tracking and locating system is proven effective assuming the same coverage area and using the Simplified Path Loss model and the Path Loss Scatter analysis. The system of the present invention, when using the frequency of 433 MHz, has an operating range at least 2.2 times greater than the 2.45 GHz system. Moreover, employing the system in an operating range of 10 meters and a path loss exponentiation factor of n=4 at 2.45 GHz, the operating range at 433 MHz is 22 meters. As determined, at 433 MHz, the path loss exponentiation factor n is reduced by a factor of approximately 1.3, which is consistent with the previous study.

Accordingly, the wireless RF-based tracking and locating method and system of the present invention when operating at VHF frequencies can increase the operating range and improve the power ratio between the Direct Line of Sight (DLOS) signal and all other indirect path signals by reducing the path loss exponentiation factor n.

The operating range gain can be achieved, according to the data of both cases, not by increasing the signal power, but by reducing the operating frequency of the system. Thus, the RF propagation effects are reduced, as can be measured by a lower path loss exponentiation factor n, the operating range is extended, and the power ratio between the Direct Line of Sight (DLOS) signal and all the other indirect path signals is improved.

The method of the present invention can employ longer wavelengths or lower frequencies such as the VHF or HF bands to construct an indoor RF tracking and location system or to construct an outdoor RF tracking and location system. Currently no such systems that operate in these frequency bands are being produced on the market. One possible reason is that the Federal Communication Commission (FCC) has allocated spectrum of the available frequencies to severely limit the allowable signal bandwidth in the VHF, HF and lower frequencies' bands.

This is also generally attributable to the approach based on developing a wide signal bandwidth and commonly assuming that a wide signal bandwidth is necessary for high accuracy distance measurements. The wide bandwidth ranging signal simplifies the RF channel implementation and ranging signal base-band processing for obtaining high-resolution distance measurements. However, it does not help when the narrow bandwidth requirement at low frequencies restricts the data throughput of any wireless network infrastructure or devices, and has forced all wireless telecommunication networks to operate at the UHF band of 900 MHz—or higher, where the allowable signal bandwidth's orders of magnitude larger than VHF.

According to the Time-Of-Arrival (TOA) system of the present invention, the distance measurement resolution when using a ranging signal that has a finite duration is provided, where the Mean Squared Delay Estimation (MSDE) error $\epsilon^2$ bound for Signal to Noise Ratio (SNR)>13 dB (Cramér-Rao bound) for a finite duration sinusoidal signals of energy E and frequency $\omega_0$ is given by the following equation:

$$E[\varepsilon^2] = 1(\omega_0^2 * SNR), \text{ where } SNR = E/\sigma_n^2 \quad (1)$$

where $\sigma_n^2$ is the noise energy. From Equation (1), the TOA distance measurement resolution can be improved (i.e., the time-delay estimation error can be reduced) by working with higher frequency ranging signals (bandwidth).

As the signal bandwidth is bounded by the highest frequency contained in the ranging signal, increasing the SNR also reduces the time-delay error and consequently improves the TOA distance measurement resolution while keeping the ranging signal bandwidth low and detecting the highest frequency in the ranging signal.

Additionally, the SNR can be improved by averaging sampled values of the returned ranging signals over a number of consecutive ranging signals. As the number of these consecutive ranging signals (and samples) increases, the value of $\sigma_n^2$ decreases, thereby improving the SNR.

Preferably, coherent summation is used on the multiple/repeated ranging signals, which are being coherently summed in the FPGA. The amplitude of a sum of N identical coherent signals is N*A, where A is the amplitude of individual (single) ranging signal. At the same time, the white (random) noise and other random distortion that is present in every individual ranging signal is also summed. However, because the white (random) noise and other random distortion is not coherent with the ranging signal, the amplitude of a sum of N identical non-coherent (random) noise signals is equal to $\sigma_n \times \sqrt{N}$, where $\sigma_n$ is the noise dispersion for an individual ranging signal. By averaging the coherent sum of N identical ranging signals, the sum of N non-coherent white noise signals is also averaged. The amplitude of this averaged signal will be equal to the amplitude of an individual ranging signal—A, but the noise dispersion will be $\sigma_n/\sqrt{N}$. Thus, the signal to noise ratio of such a coherently summed average of N signals is $\sqrt{N}$ better as compared to the signal to noise ratio of a single (individual) ranging signal, which is equal to $\sigma_n$.

Another approach is to use each returned ranging signal to determine the time delay estimate such as, for example, by using a matching filter technique and average the time delay estimates results obtained over a number of consecutive ranging signals. In the matching filter technique, any delay estimate utilizes the signal time origin so as to maximize and match the filter's output.

FIG. 1 illustrates a block-diagram depicting the master unit (reader). The master unit includes an RF Transceiver 40 for generating an RF ranging signal or for processing a received RF ranging signal. The received signal can be a reply signal or ranging signal from a slave unit (tag).

Alternatively, the received signal can be a reply signal or ranging signal from another master unit. The RF Transceiver 40 includes a receiver down-converter 42 and a transmitter up-converter 44. The down-converter 42 of the RF transceiver 40 receives a ranging or reply signal. The received signal is processed (converted) by the down-converter 42 and the down-converted signal is supplied to an amplifier 46.

The amplifier 46 amplifies the down-converted signal and sends it into a band pass filter 48 for further filtering of the down-converted received signal. After passing through the band pass filter 48 signal goes through a differential amplifier 50. The differential amplifier 50 passes the received signal to an Analog-to-Digital Converter (ADC) 52. The ADC 52 converts the received signal into digital format, for example, a 16-bit signal representation. Thus, the signal can be processed using Digital Signal Processing (DSP) and/or by Software Defined Radio (SDR) techniques/technology.

The ADC converter 52 outputs the down-converted RF signal in the digital format. The signal is sent to the FPGA 60. The FPGA 60 processed the signal by passing it through the FIR filters 64 and the Adaptive Multi-path Canceller (AMC) 90. The Adaptive Multi-path Canceller (AMC) 90 serves as an equalizer by reducing interference. The following algorithms can be used for interference reduction in the Adaptive Multi-path Canceller 90: Constant Modulo Algorithm (CMA), Decision Feedback Equalization (DFE), Vitterbi Algorithm and Kalman Algorithm, etc.

The signal is then sent to the digital demodulator 70. The digital demodulator 70 converts the filtered down-converted signal into base-band ranging signal also in a digital format. The digital demodulator 70 also filters these base-band signals.

When receiving a ranging signal, the ranging signal is filtered to a base-band signal that is sent to the base-band ranging signal processor/detector, which includes an coherent summation/integration block 72, a memory 74 such as a memory buffer or FIFO buffer, a read only memory (ROM) 75, a time-delay/distance calculator 76 and a control logic 78.

All other signals, for example base-band voice/data communication signals, after passing through the demodulator 70, baseband processing logic 76 and control logic 78 are sent to I/O controller 85 in a digital format for transferring to man-machine interface or to an external Host or for internal processing by CPU 80 connected to I/O controller 85. The FIR filters 64, the digital demodulator 70, CPU 80 and the base-band ranging signal processor, which includes the functional blocks 72, 74, 75, 76 and 78 are all implemented in FPGA 60.

Similarly, the up-converter 44 up-converts and transmits a base-band ranging signal or base-band voice/data communication signal. The base-band ranging signal values can be stored in a non-volatile memory of the FPGA 60, for example, the base-band ranging signal is stored in the ranging signal processor's ROM 75. The base-band ranging signal can be generated in a digital format by the base-band ranging signal processor (logic) implemented in the FPGA 60 logic.

The base-band ranging signal is passed to the up-converter 44 through the Digital-to-Analog Converter (DAC, for example 12-bit) 54 and the band-pass filter 56. The output of the band-pass filter 56 is sent to the up-converter 44 of the RF transceiver 40. The up converter 44 of the RF transceiver 40 includes the RF modulator. Similarly, base-band voice/data communication signals will follow the above-mentioned path.

Referring to FIG. 1, in the FPGA 60, the integration block 72 (labeled $\Sigma$) assembles all of the values for the base-band ranging signal by performing coherent/incoherent summing. In the FPGA 60, the RAM memory serves as a memory buffer or FIFO buffer, for example, to store ranging signal samples values and values from distance calculations. In the FPGA 60, the time-delay/distance calculator 76 generates values for the distance calculation.

In the FPGA 60, I/O controller 85 controls data, status and requests in the CPU 80 of the FPGA 60 and the ports. In the FPGA 60, the general purpose port(s) and RS232 interface are available to interface to other computers, speakers and microphones to provide an effective man-machine interface 91.

Element 33 is a thermal sensor that measures the temperature of critical component(s) in the RF transceiver 40. Its purpose is to offset changes in the signal propagation in the RF transceiver 40 circuitries. Element 34 is flash memory that permanently stores the FPGA 60 configuration. The FPGA cannot retain its configuration after power is OFF. This is done in the element 34. After power-up the content of the element 34 flash is uploaded into FPGA 60. Element 35 is the system clock, for example, 20 MHz.

Figure 2:
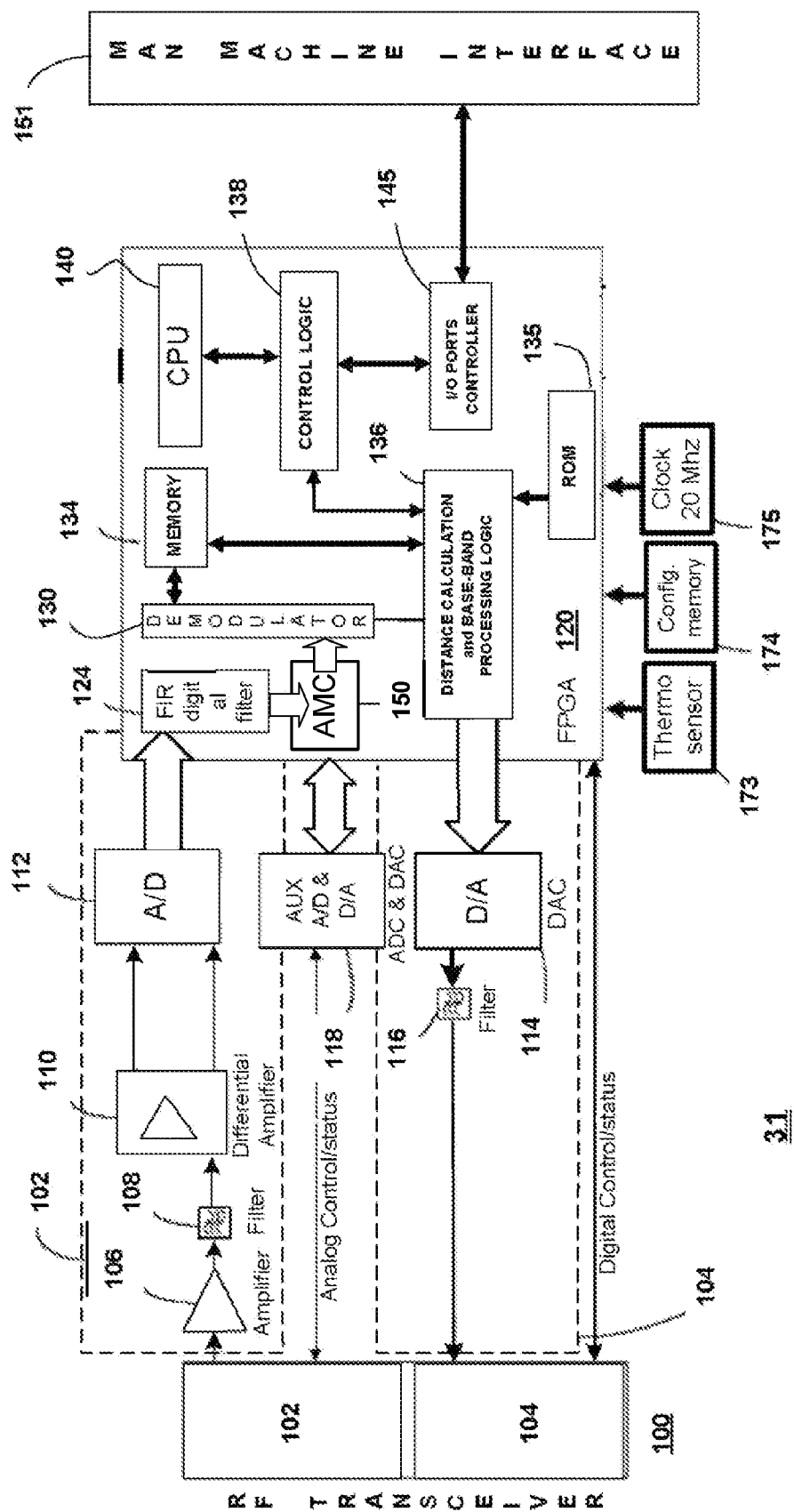
FIG. 2 is a block diagram of a slave unit (tag) of an RF mobile tracking and locating system.

FIG. 2, illustrates a block-diagram of the slave unit (tag) acting as a target (tag). Alternatively, FIG. 2 illustrates a block-diagram of the circuitry of a master unit that is acting as a target (tag) T. The RF transceiver (up/down converter) 100 operation is identical to the master's RF transceiver (up/down converter) 40 in FIG. 1.

Element 173 is a thermal sensor that measures the temperature of critical component(s) in the RF transceiver 100. Its purpose is to offset changes in the signal propagation in the RF transceiver 100 circuitries. Element 174 is flash memory that permanently stores the FPGA 120 configuration. The FPGA cannot retain its configuration after power is OFF. This is done in the element 174. After power-up the content of the element 174 flash is uploaded into FPGA 120. Element 175 is the system clock, for example, 20 MHz.

The RF transceiver 100 receives signals and supplies them to the down-converter 102. The received signal is down-converted by block 102 and passed on to an amplifier 106. The amplifier 106 amplifies the received down-converted signal and then passes it on to a band pass filter 108. Then the filtered signal passes through differential amplifier 110 and sent to an Analog-to-Digital Converter (ADC) 112, which converts the received signal into a digital format. The digital signal then can be processed by using DSP or SDR techniques/technology.

The output of the ADC converter 112 is sent to the FPGA 120. The down-converted digital RF signal is passed through the FIR filters 124 and through the Adaptive Multi-path Canceller 150. The Adaptive Multi-path Canceller 150 serves as an equalizer by reducing interference. The following algorithms can be used for interference reduction in the Adaptive Multi-path Canceller (AMC) 150: Constant Modulo Algorithm (CMA), Decision Feedback Equalization (DFE), Vitterbi Algorithm and Kalman Algorithm, etc.

Then the signal is sent to the digital demodulator 130. The digital demodulator 130 converts the filtered down-converted digital signal into base-band signal (this could be ranging signal or voice/data communication base-band signal also in digital format).

The digital demodulator 130 also filters these base-band signals. In case of the ranging signal this filtered base-band signal is sent to the base-band ranging signal processor/detector, which includes memory 134 such as RAM or FIFO buffer, read-only memory ROM 135, time-delay/distance calculation logic 136 and control logic 138.

All other signals, for example base-band voice/data communication signals, after passing through the demodulator 130, baseband processing logic 136 and control logic 138 are sent to the I/O Controller 145 in the digital format for transferring to man-machine interface/external host or for internal processing by the CPU 140 coupled the I/O Controller 145. The FIR filters 124, the digital demodulator 130, the CPU 140 and the base-band ranging signal processor, which includes RAM 134, ROM 135, time-delay/distance calculation and baseband processing logic 136, and control logic 138 are all implemented in FPGA 120.

During the processing the received base-band ranging signal in a digital format is stored in memory 134. After processing in the FPGA 120, stored in the memory 134 base-band ranging signal in a digital format is sent to the up-converter 104 through the Digital-to-Analog Converter (DAC) 114 and the band-pass filter 116. The DAC 114 converts the base-band ranging signal in a digital format into an analog base-band ranging signal.

As discussed above, the FPGA 120 can be configured to operate on a request and transmit a ranging signal back to the master searching monitor when a monitoring communication is established. The up-converter 104 operates to transmit a base-band reply signal based on the received ranging signal. The reply signal can be modified by the control logic of the Field Programmable Gate Array (FPGA) 120. The base-band ranging signal can be stored in a non-volatile memory of the FPGA 120, for example, in ROM 135.

The RF transceiver 40 and RF transceiver 100 can be constructed using the same hardware components. Similarly, the circuit components of amplifiers 46 and 106, filters 48 and 108, differential amplifier 50 and 110, ADCs 52 and 112, DACs 54 and 114 can be implemented by using the identical components. The FPGA 60 and FPGA 120 are similar in some respects, but differ in the functions performed for either the master unit 21 or the slave units 31. For example, the FPGA 60 includes all of the FPGA 120 base-band ranging signal processing and signal generation functionality. The difference between the master and the slave units can be in the algorithms and/or software that are programmed in the FPGA (60 or 120) and in the FPGA core microprocessors software (CPU 80 and CPU 140 respectively).

The base-band ranging signal is a cosine waveform of 200 µs duration, from $-\pi$ to $+\pi$, which essentially limits the ranging signal bandwidth to 10 KHz or lower. However, other waveforms can also be used and have been found useful in the present invention and it should not be limited to such signals. The base-band ranging signal processor/detector coherently averages the returned ranging signals samples values over a number of consecutive ranging signals. Then, it calculates delay time by finding the "center of gravity" time value (origin) of the averaged returned ranging signals waveform relative to the "center of gravity" time value (origin) of the reference generated ranging signal stored in the ROM 75 of FPGA 60.

Alternatively, it is possible to average all the generated ranging signals and use the "center of gravity" time value of the averaged generated ranging signals waveform as the reference. All of the functionality of the FPGA 120 is included into the FPGA 60. Thus, any master unit can also operate as a tag.

One of the approaches to reduce the coherent noise is zero/π modulation. The white (non-coherent) noise can be reduced by employing coherent summing. However, coherent (non-random noise) will not be reduced using this approach, because its amplitude will add the same way as the signal of interest. One approach to reduce the coherent noise is to employ zero/π modulation. The coherent noise may exist inside the device as result of clock noise coupling, etc.

Rather than transmitting a train of identical ranging signals (pulses), a series of signals where the odd-numbered ranging signals have a π (180 degrees) phase shift relative to the otherwise identical even-numbered ranging signal. Once received, the π phase shift is removed from the echoes corresponding to the odd-numbered pulses, so that during the coherent summing process, they add constructively with the even-numbered signals.

The coherent noise, on the other hand, does not experience the alternating 0/180 degree phase shift, so that when it is received it experiences the compensating phase shift of the odd-numbered pulses, it adds destructively with the sample of coherent noise that accompanied the even-numbered pulse. The result is a reduction or cancellation of the coherent noise while preserving the desired ranging signal. While implementation in the analog domain would introduce amplitude and phase imperfections that will limit this cancellation effect of the coherent noise reduction, nearly perfect implementation can be realized with the introduction and removal of the π phase shift in the digital domain, e.g., in FPGA 60 and 120. This is done by digitally generating two transmit base-band ranging signals differing only in their phase and then removing this phase shift following the receiver ADC base-band processor (in FPGA 60 and 120).

Additionally, ability to operate on various channels at different frequencies can be utilized, where signals at several different wavelengths are generated. In some cases, the FCC allows concatenation of two or more consecutive channels and/or allows operating on multiple non-concatenated channels. In other instances, it is possible to operate on an unused TV channel. The ability to operate on several concatenated channels or an unused TV channel allows for an increase in the ranging signal bandwidth. This wider bandwidth may lead to further improvements in distance measurement resolution and multi-path rejection, and gaining additional information by the group delay of a wide band emission The ability to operate on several channels at different frequencies provides additional information that can be used to further reduce the multi-path influence on the distance measurements. For example, one multi-path phenomenon is so called "frequency selective fading." This phenomenon can result in deep nulls in the received signal power spectrum due to destructive interference between multi-path signals.

An adaptive equalizer can mitigate this fading and reduce the undesired distance measurement error that is associated with it. However, the incoming ranging signal SNR will be severely degraded and cannot be fully restored by any form/algorithm of adaptive equalization. Thus, upon detecting such condition (using available adaptive equalizer) the best defense would be to change channel (operating frequency) away from the channel that experiences the severe fading.

Also, operating on multiple frequencies allows for more accurate multi-path propagation channel estimation/characterization/identification by using statistics (data) obtained/accumulated from several different channels (frequencies). This, in turn, will further improve the distance measurement multi-path immunity without compromising the operating range.

For military, defense and public safety applications, stealth and robustness from jamming is often highly desirable. Non-military or industrial and consumer ISM band (Part 15) applications require certain emissions to be spread to benefit from higher power unlicensed operation and to allow coexistence with other services. The proposed system is based on narrow-band analog techniques which could be easily digitally spread to occupy a wider bandwidth. Since the carrier information is originally extremely narrowband, moderate spreading could easily hide the transmission with substantial processing gain within an existing analog channel. Spreading would not only hide transmissions, but make it less susceptible to jamming, increase the multi-path immunity, and benefit from more advanced signal processing techniques and from additional information on the propagation characteristics over a wider bandwidth. Since the ranging signal is coded by a known sequence, further processing can be done to reduce the effects of multi-path, fading, jamming, or channel to channel interference. A highly spread ranging signal can easily have very low energy per Hz allowing it to be completely unseen and buried in the noise of an analog channel for stealth operation or enable UWB (Ultra Wide Band) ranging application.

To preserve the phase of the digital signal, DSSS (Direct Sequence Spread Spectrum) techniques can be employed. The coded ranging signal can also mathematically correct analog hardware delay errors, the entire digital coding & decoding process can reside in microcontroller code or FPGA state machine or ASIC. The associated spreading code is not limited as a digital channel, but also benefit from common communications techniques (Rake, Vitterbi, Reed/Solomon, OFDM, error correction, etc.) that enhance BER (Bit Error Rate) & EVM (Error Vector Magnitude) under real-world conditions ranging from weak signal, multipath effects, fading, or jamming. The signal sequence can also be encrypted to prevent fooling a target system location. The ranging signal can also be partly coded with its data to assist in system communications or user communications between units.

The invention can also occupy a narrow band channel and be hopped through a hopping sequence otherwise known as FHSS (Frequency Hopped Spread Spectrum). In such an application, the ranging signal would be treated as an independent narrow band channel that is allowed change frequency through an algorithm which the system is synchronized too. Such system would never allow a channel to occupy any one frequency for other than a moment; many systems or services could coexist in the same band. Each channel would be corrected by calibration routines, tables or algorithms that estimate and correct the channel errors over the occupied FHSS bandwidth. Such modulation scheme is also compatible with common ISM standards such as Zigbee, Bluetooth or other digital FHSS systems.

The invention is not limited to VHF applications where a multi-path phenomenon is less of a factor. For airborne or space applications, the environment is less susceptible to multi-path phenomena at shorter wavelengths since there are fewer reflective objects than for land based applications. As a result, this system is very well suited for frequencies above VHF as well.

In cases where wide bandwidth ranging signals are allowed, the pulse compression technique is known and is used extensively in radars, but not in RFTL. It also allows to increase the resolution of temporally extended signals. Other benefits include improved multi-path performance. However, this technique still requires a relatively wide bandwidth ranging signals (in MHz). Because of the limitations of current state-of-art electronics it is not possible to obtain a meaningful resolution gains from narrow-bandwidth ranging signals (few KHz).

In some cases, it is possible to concatenate several consecutive RF channels to expand the available bandwidth and/or to operate at unused TV channel. For example, in San Jose the 210-216 MHz TV channel is not used. At 6 MHz bandwidth using pulse compression techniques, it is possible to obtain distance measurement resolution that is a fraction of a meter, and significantly improve the multi-path immunity without resorting to other means, for example adaptive equalization. The drawback of such high ranging signal bandwidth is loss of the operating range, but this too can be somewhat mitigated through the coherent summing.

Figure 5:
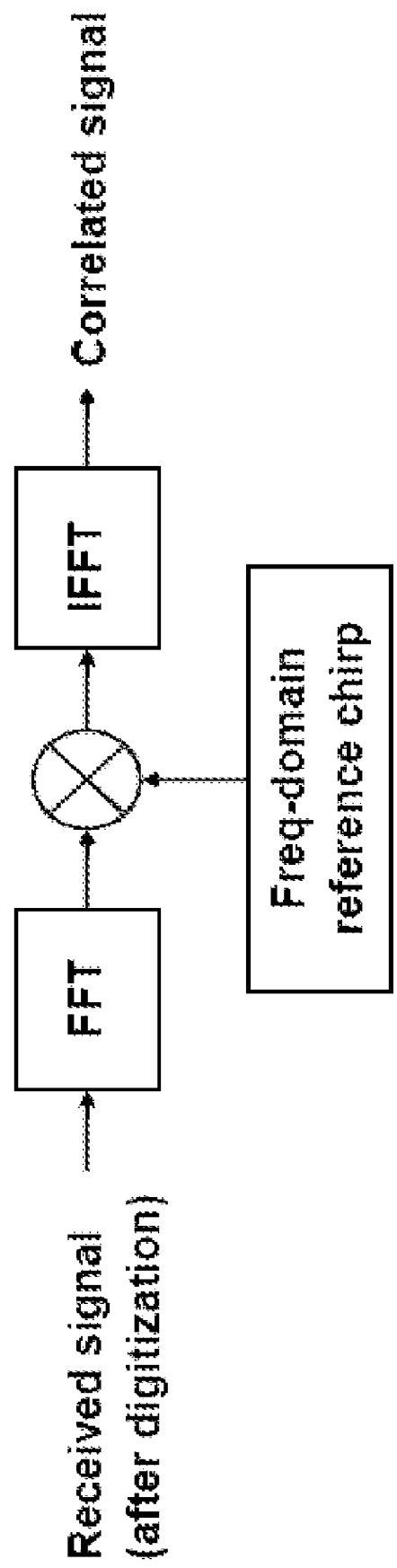
FIG. 5 illustrates correlation processing of chirp signals.

Pulse compression can be implemented using pulse-coding (Barker codes), chirp generation and compression, etc. There are many implementation schemes. The one that is closely matches the described device architecture is the correlation processing of chirp signals (see FIG. 5):
Convert received signal to freq domain (FFT);
Multiply with freq domain version of reference chirp function;
Convert product back to time domain (IFFT).

Implementing the pulse compression technique will not require any changes in the Master/tag device architecture and only small changes in the device hardware. In the preferred embodiment the IF filters in the RF Front End will be changed to accommodate a wider spectrum of the ranging signal. All other changes will be handled in the FPGA 60/120. For example, the digital modulator can be reprogrammed to generate the new ranging signal. The FFT, IFFT and frequency domain reference chirp functions can be added to the FPGA 60/120 through programming.

Figure 3:
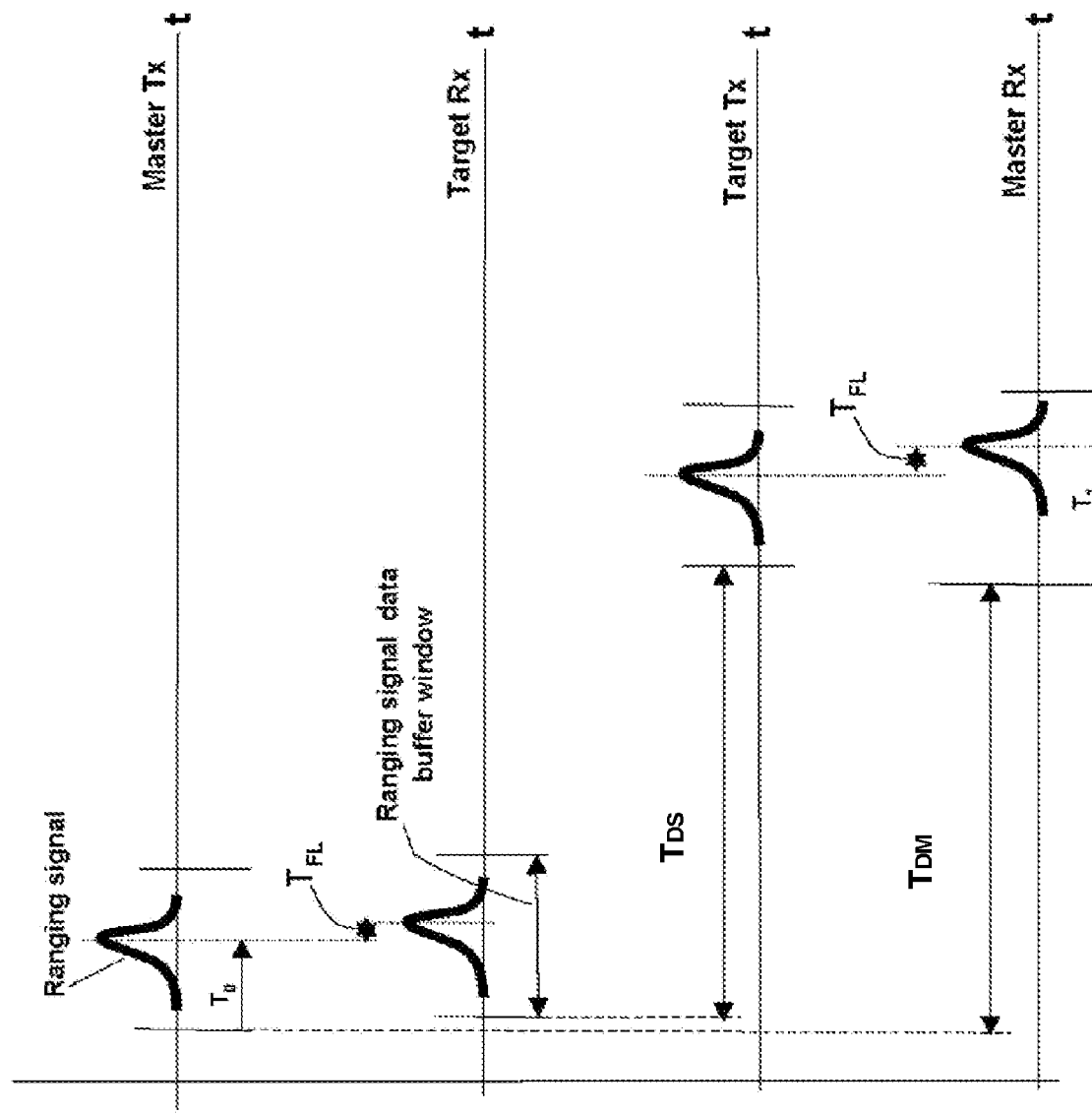
FIG. 3 shows a signal used in an RF mobile tracking and locating system.

FIG. 3 illustrates a diagram of a ranging signal sequence used in this invention RF-based tracking and locating system $T_{FL}$ is "Time of Flight" of the ranging signal between Master and Tag and Tag and Master, e.g. round trip. $T_{DM}$ and $T_{DS}$ are Master and Slave (Target) RF Transceiver/Transponders ($R_x$-to-$T_x$)/($T_x$-to-$R_x$) switching time(s).

Conceptually, $T_{DM}$ is equal to $T_{DS}$. However, in the present invention for the purpose of collecting of the 24 DC component samples the master and tag delays ($T_{DM}$ and $T_{DS}$) have to differ for 24 sampling intervals. The originating master switches the RF transceiver 40 (see FIG. 1) to transmit the ranging signal. In a first step, after $R_x$-to-$T_x$ switching time, the FPGA 60 (see FIG. 1) generates the base-band ranging signal that modulates the RF carrier in the RF transceiver 40 by passing it through the up-converter 42 and the modulated RF ranging signal is sent to the tag $T_x$ (in FIG. 3).

At the time the first single instance of the ranging sequence is sent, the control logic 78 (see FIG. 1) FPGA 60 starts a count of the $T_{DM}$ time (see FIG. 3). After the ranging sequence is transmitted the RF transceiver 40 (see FIG. 1) is switched from the transmit state to a receive state. However, an output of the down-converter 44 is ignored (disabled) until the TDM time count expires. Thus, energy savings are achieved by stopping the ADC 52 clock and DAC 54 clock and disabling some other circuits, such as the circuits in the receiver portion of the RF transceiver 40 and FPGA 60 that continue to cycle and use power.

Additional parameters can also be used. Such parameters can include the RSSI (Received Signal Strength) level obtained from the RF transceiver 40 through the control/status signals from the circuit 58 of FIG. 1 and the digital demodulator 70 of FIG. 1. The control signals disable or re-start clock and disable or re-enable the circuits.

Figure 4:
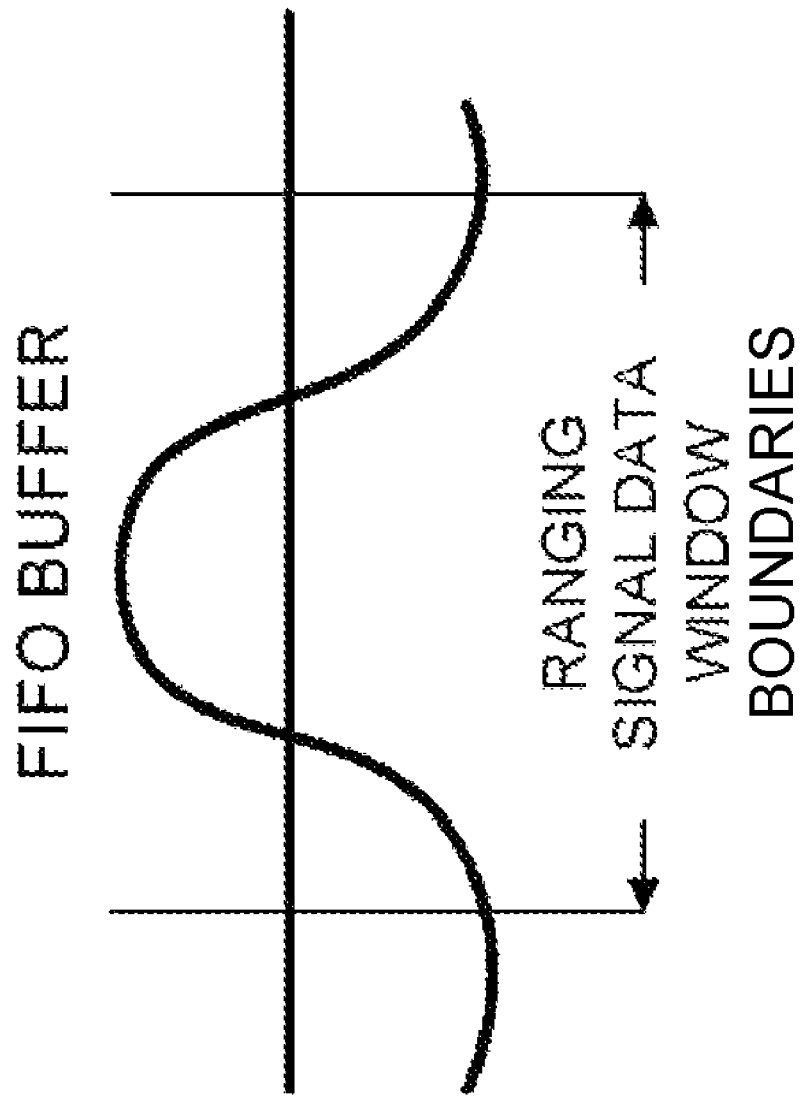
FIG. 4 is a diagram of a signal in a FIFO (first in-first out) buffer of an FPGA of the master or slave unit of FIGS. 1-2.

In a second step, the tag T (e.g., slave or master) which is in a "receive" state, receives, transceiver 100 in FIG. 2, and down-converts (in converter 102) the RF ranging signal. After converting the signal in the ADC 112, the digitized base-band down-converted ranging signal (data sample) is sent to the FPGA 120 (see FIG. 2). Inside the FPGA 120 the down-converted base-band ranging signal is passed through the FIR filters 124 in a digital format and passed through the digital demodulator 130. The demodulated base-band ranging signal is stored in the FIFO buffer RAM 134, while the FPGA 120 control logic 138 determines the valid base-band ranging signal data window end/start-points (borders) shown in FIG. 4.

In a third step, the tag T unit processes the base-band signal scans by analyzing the received base-band ranging signal samples. The following parameters are identified:
a peak of the base-band ranging signal;
a signal amplitude decrease (or increase);
a point when the signal level is constant.

Thus, the end-point (window boundary) of the valid base-band ranging signal data window is defined. Also, this window start-point boundary is determined (see FIG. 4). To reduce the noise impact, the method determines an average of m (for example m=10) data points and uses the average of m to determine: the base-band ranging signal peak, the amplitude decrease (or increase) and the constant signal level. The additional parameters for determining the signal data window can include the time duration of the amplitude decrease.

In a fourth step, after the window borders are defined, the tag RF transceiver 100 is switched to "transmit" mode. After the Rx-to-Tx delay the base-band ranging signal samples from the FIFO buffer in memory 135 are transferred to DAC converter 114 through the I/O controller 145 and consequently re-transmitted back to the originating master by the transceiver 100 through the up-converter 104. The base-band ranging signal samples transfer delay count begins after the base-band ranging signal window boundaries (the end/start-points) are determined.

As illustrated in FIG. 3, the transfer begins $T_{DS}$ time later from the base-band ranging signal window boundary (the start-point) and includes the Rx-to-Tx delay. Upon re-transmitting the received ranging signal, the tag RF transceiver 100 is switched back to receive mode. For energy savings, the ADC 112 and DAC 114 clocks can be stopped and the circuits in the receiver portion of the RF transceiver 100 and FPGA 120 are disabled. Parameters such as the RSSI level obtained through the control/status signals from circuit 118 and digital demodulator 130. The control/status signals are used to disable and re-start the clocks and disable/re-enable the circuits.

In a fifth step, the originating master RF transceiver 40 is in the "receive" state—the $T_{DM}$ time has expired. The originating master RF transceiver 40 receives the re-transmitted (returned) ranging signal in a form of a modulated RF signal. The RF transceiver 40 receiver produces the down-converted analog base-band ranging signal. After converting and sampling by ADC 52, the digitized base-band ranging signal (data samples) is sent to the FPGA 60. Inside the FPGA 60 the down-converted base-band ranging signal is passed through FIR filters 64 and then to the digital demodulator 70.

Then, the demodulated base-band ranging signal in digital format is stored in the FIFO buffer in RAM 74, where the values of the current samples are added using the coherent integration/averaging block 72 (see FIG. 2) to the values of the samples from previous ranging signal instances. The initial buffer content is zero and the accumulating buffer length is equal to 256 samples. The buffers of various sizes can also be used depending on the base-band signal sampling rate and other requirements.

After the $T_{DM}$ time expires, the FPGA 60 starts generating the next base-band ranging signal instance ($T_{DM}$+constant) time later from the $T_{DM}$ count expiration. Steps 1 through 5 are repeated until the number of accumulated ranging signal instances reaches a predetermined number N. N is programmable and can be set by an operator or determined through an adaptive algorithm for a particular signal. The returned instance of base-band ranging signal samples accumulation is completed before the next instance is received.

Alternative implementation of the system can be used having the base-band ranging signal duration of 200 samples. The accumulating buffer RAM 74 in the FPGA 60 of FIG. 1 or the similar buffer RAM 134 in FPGA 120 of FIG. 2 can be used assuming a base-band ranging signal sample rate of 1 microsecond. The first 23 locations of the RAM accumulating buffer are reserved for determining the DC component value. The RAM accumulating buffer allocates the memory as follows:

First 0-22 number buffer locations—hold samples that are used for determining the DC component value;

Location number 23—holds first base-band ranging signal sample in case of Zero Time of the round trip flight of the ranging signal; the round trip flight time is equal to $2 \times T_{FL}$ (see FIG. 3);

Locations number 24-52—contain first base-band ranging signal sample in case of non-zero Time of flight $T_{FL}$ of the ranging signal. Thus, the maximum (round trip) time of flight is up to 28 samples (28 μs), which will cover the one-way master-tag distance of more than 4 km (~2.5 mi);

The rest of the buffer locations, including sample 252 hold remaining base-band ranging signal samples; and buffer locations number 253-255 are used as reserved locations.

Alternative buffer structures can be also used and include, for example, a structure that holds base-band ranging signal samples in the middle of the buffer. For collecting of the 24 DC component samples the Master and tag delays ($T_{DM}$ and $T_{DS}$) have to differ for 24 sampling intervals, which equals in total to 24 μs.

Once the number of loops (steps 1-5) reaches N, base-band signal processing determines a subtraction value between a DC (constant) component associated with the ADC 52 (or ADC 112) platform and the noise. After the subtraction of DC component (of 0-19 locations), the ranging signal time of flight calculated in the distance calculation/baseband processing logic 76 of the master's FPGA 60 is determined. Then the average of the values of accumulated samples over N consecutive ranging signals (averaged returned base-band ranging signal waveform) is determined.

Then the time of flight (delay time) is calculated by finding the "center of gravity" time value (origin) $T_1$, of the averaged returned ranging signal waveform. Subsequently, the process of the present invention calculates the roundtrip time of flight value $$T_{FL} = T_1 - T_0 - \Delta_{TDS} \quad (2)$$

where $T_0$ is the "center of gravity" time value (origin) of the reference base-band ranging signal waveform generated by the master unit.

Alternatively, the value of $T_0$ in Equation (2) may be a pre-calculated value stored in ROM 75 of the FPGA 60 (FIG. 1). The value of $\Delta_{TDS}$ in Equation (2) is determined during calibration. This value takes into account possible clock timing differences between master and tags that tend to affect the $T_{FL}$ value determinations: $\Delta_{TDS} = T_{DS} - T_{DM}$.

The $T_{DM}$ and $T_{DS}$ times are fixed time delay values that include the following: master's and the slave's ($R_x$-to-$T_x$)/($T_x$-to-$R_x$) transceivers 40/100 switching time; the base-band ranging sequence time duration; the ranging signal propagation delays and the variations of these delays through the signal processing circuitries of transceivers 40/100 and FPGA(s) 60/120. Conceptually, $T_{DM}$ is equal to $T_{DS}$. However, for the purpose of collection of the 24 DC component samples the master and tag delays ($T_{DM}$ and $T_{DS}$) have to differ for 24 sampling intervals, which in present invention is equal to 24 μs.

A possible difference in clock periods between master-tag and master-master devices can be also expressed by coefficient k that allows translating the clock period of one device into clock period of another device. Determination of this coefficient value is included into the calibration operations:

$$T_{FL}=T_1-T_0-k*T_{DS}-T_{DM} \quad (3)$$

Alternatively, the $T_{FL}$ value can be determined as follows:

$$T_{FL}=T_1-k*T_{DS} \quad (4)$$

Here $T_1$ is counted by the master's FPGA 60 and the $T_1$ count starts from the time the first single instance of the ranging sequence is sent by the master's FPGA 60. $T_1$ is counted by the originating master unit and $T_{DS}$ is counted by slave or another master.

The calibration process is performed periodical (automatically) by the device/system or upon an operator's request. In a first step, the master unit starts the counting of the $T_{DM}$ time for distance measurement. Throughout the calibration process it is necessary to determine the $\Delta_{TDS}$ as, for example, the difference between $T_{DM}$ and $T_{DS}$ using a master or a tags clock as a reference.

If the master unit 21 is calibrating, it will set the RF transceiver 40 to transmit and FPGA 60 generates the standard base-band ranging signal that will passed through the RF transceiver 40 transmitter's up-converter modulator 44. After the signal is transmitted, the RF transceiver 40 is switched into receive mode and waits for the reply.

Upon reception of the transmitted ranging signal the tag will respond (transmit back) with two ranging signals (generated by the FPGA 120) with the interval of $T_{DS}$ (or $T_{DM}$+ const in case of a master unit being calibrated). The master's unit down-converter 42 produces the two down-converted ranging signals separated by the time interval $T_{DS}$ (or $T_{DM}$+ const). These down converted base-band signals after converting and sampling by ADC 52 are sent to the FPGA 60.

In anticipation of these two signals, the FPGA 60 will "open" two time windows: one is the usual window that starts after the TDM and the second one that starts after the ($T_{DM}$+ const+$T_{DS}$) or 2*$T_{DS}$ time, where $T_{DS}$ is counted (measured) with the value of the master unit's clock. The first received demodulated (e.g. base-band) ranging signal is stored in the accumulating buffer of RAM 74, while the second received demodulated (e.g. base-band) ranging signal is stored in the auxiliary buffer also residing in RAM 74 of the FPGA 60.

After the second ranging signal is transferred into the auxiliary buffer, the calibration process is started in FPGA 60. The calibration process uses the samples stored in each buffer in the same manner as in calculation of the time of flight. The "center of gravity" time value (origin) for data in each buffer is determined. The difference between these values, the $T_{DS}$ count is determined using master clocks. By comparing the tag and master clock counts for the same $T_{DS}$ time the $\Delta_{TDS}$ value is found. Note that $T_{DM}$+const value can be chosen to be equal to the $T_{DS}$ value, for example.

A higher accuracy can be achieved by repeating the calibration procedure P times, and by averaging of accumulated $\Delta_{TDS}$ values over P. The difference in clock periods between master-tag and master-master devices can be also expressed by coefficient k that allows translating the clock period of one device into clock period of another device. To determine this coefficient value it is not necessary to use the ($T_{DS}$ and $T_{DM}$) values. For example, a fixed number of clocks can be used. This coefficient can be also used in case when some masters are operating in the "satellite mode."

It is preferred to accurately (to within +/−10 ns) track the ranging signal propagation delay time and delay time variations through the device circuitry. The propagation delay time and its variations directly affect the $T_{FL}$ values. The delay time variations are function of ambient temperature, signal strength, supply voltage, etc.

Therefore, in one embodiment, the present invention employs SDR (Software Defined Radio) and DSP techniques utilizing digital filters 64/124 and digital demodulator 70/130. SDR and DSP is used in conjunction with the RF front-end circuits propagation delay measurements, which include loop-back/self testing under control of FPGA 60/FPGA 120 for some or all of the RF front-end circuits and propagation delay estimates of some other circuits by measuring the components temperature, signal strength, and the like.

The SDR/DSP implementation eliminates the temperature and signal strength (within the SDR system dynamic range) dependency. However, the limitation of the current semiconductor technology does not allow implementing the whole RF transceiver (up/down converter) functionality in the SDR/DSP-compliant digital format. The propagation delay measurements and the propagation delay estimation(s) can be conducted periodically under the FPGA 60/FPGA 120 control and upon changes in temperature, signal strength or other conditions. For example, upon request from a master, all propagation delay measurements and the propagation delay estimation(s) can be performed under control of the FPGA 60/FPGA 120.

The time required for distance determination between multiple masters and the tag can be reduced by having one of the multiple masters being the originating master (OM). The OM operates in the "single originating master" mode while the rest of the masters are operating in the satellite mode as follows:

All satellite masters' RF transceivers 40 are switched to a "receive" mode. Each satellite master receives two ranging signals: one that is generated by the single originating master unit and the other one that is re-transmitted by the tag. After reception of the first ranging signal from the OM, the satellite master stores the base-band signal in the OM accumulating buffer (FPGA 60, RAM 74) and determines the end/start-point (window boundaries) in the same way as the tag does it in the normal operation.

This window start-point will be used for generating windows for all of the consequent ranging signals from the OM (the time interval between these windows is equal to: ($T_{DMS}$+ constant)). All of the signals, including the first signal, are accumulated in the satellite's OM buffer RAM 74 in the same way as the originating master accumulates base-band ranging signals from the tag in the normal operation: the $T_{DMS}$ is equal to the $T_{DM}$ of the satellite master.

The second ranging signal from tag is delayed for $T_{DS}$ time. The satellite master generates the second window that is shifted from the first window by $T_{DS}$ time and stores and accumulates the second base-band ranging signal in the tag RAM accumulating buffer (FPGA 60, RAM 74) in the same fashion as the first received base-band ranging signal is stored and accumulated.

Upon completion of the base-band ranging signals, the satellite master unit calculates (FPGA 60, block 76) the time of flight (delay time) for each ranging signal, using the same procedure as in single originating master operation. The difference between the time-of-flight values of two base-band raging signals can be used to determine the tag position relative to the OM and the satellite masters.

Note that all Masters (single originating and satellite) use the same ($T_{DM}$+const) and ($T_{DMS}$+constant) values. However, the same ($T_{DM}$+const) or ($T_{DMS}$+constant) value is counted by different Master units with a possible difference in clock periods between each unit. This difference in clock periods can be expressed by a coefficient matrix—$k_{mij}$ that allows translating the clock period of i-th m (master) device into clock period of j-th m (master) device.

Similarly, for slave units clock periods translation for determination of the $T_{DS}$ value by a master unit can be accomplished through the $k_{msij}$ matrix, that allows to translate the clock period of j-th s (slave) device into clock period of i-th m (master) device. The determination of the individual coefficient values is performed as in calibration procedures described above.

In case of DTOA locating, all tags are actually masters. Originating and satellite Masters forms DTOA pairs and act as if to perform distance measurement between themselves. A DTOA pair consists of two satellite masters or the originating master and a satellite master, under the originating master control. One of the Masters in each pair is operating as a master and another one as a tag; the originating master is always in the Master mode.

All master-tags' RF transceivers 40 are switched to a "receive" mode. Each tag receives two ranging signals from each DTOA pair (one from a satellite/OM master unit acting as a master and other from a satellite master unit acting as a tag). After reception of the first ranging signal from the master, the master-tag stores the base-band signal in the its accumulating buffer (FPGA 60, RAM 74) and determines the end/start-point (window boundaries) in the same way as the tag does it in the normal operation.

This window start-point will be used for generating windows for all of the consequent ranging signals from the master in above-mentioned DTOA pair (the time interval between these windows is equal to: (TDMS+constant)). All of the signals, including the first signal, are accumulated in the tag master buffer RAM 74 in the same way as the originating master accumulates base-band ranging signals from the tag in the normal operation: the TDMS is equal to the TDM of the master in above-mentioned pair.

The second ranging signal from the satellite master acting as a tag in the above-mentioned DTOA pair is delayed for TDS time. The master-tag generates the second window that is shifted from the first window by TDS time and stores and accumulates the second base-band ranging signal in the tag RAM accumulating buffer (FPGA 60, RAM 74) in the same fashion as the first received base-band ranging signal is stored and accumulated.

Upon completion of the base-band ranging signals, the master-tag unit calculates (FPGA 60, block 76) the time of flight (delay time) for each ranging signal, using the same procedure as in single originating master operation. The difference between the time-of-flight values of two base-band raging signals is sent to the originating master.

This process repeats for each DTOA pair combination and in every instance the difference between the time-of-flight values of two base-band raging signals is sent to the originating master. This information is used to determine each master-tag position relative to the OM and the satellite masters.

Note that all Masters in DTOA pairs use the same (TDM+const) and satellite masters acting as a tag in the DTOA pair use the same TDS) values. However, the same (TDM+const) or (TDS) value is counted by different Master units with a possible difference in clock periods between each unit. This difference in clock periods can be expressed by a coefficient matrix—kmij that allows translating the clock period of i-th m (master) device into clock period of j-th m (master) device.

Similarly, for satellite masters acting as slave units clock periods translation for determination of the TDS value by a master unit can be accomplished through the kmsij matrix, that allows to translate the clock period of j-th s (slave) device into clock period of i-th m (master) device. The determination of the individual coefficient values is performed as in calibration procedures described previously.

The distance measurement platform described in this patent application can be used many different ways. The distance measurement platform can be used for providing proximity information, or with additional triangulations techniques, location information.

The invention can utilize a "smart tag" or Master unit that is attached to a computer or PDA that provides a visual display of the location of other units, or it can be embodied in a standalone handheld device, similar in size to a PDA, that constitutes the master unit and includes its own visual display. In another embodiment, some of the "slave units" (tags) can be fixed in place and the system can function much as a conventional RFTL system, dependent on fixed readers using UHF RFID technology. The advantage of the current system is that it provides much greater range for each reader unit. Thus, to provide coverage to a given amount of space such as an office building or a campus of buildings, fewer readers are required than using conventional readers. Since the costs of readers are comparable this means that a system based on this technology will require far fewer readers and be significantly less expensive than one using conventional UHF technology. This will be particularly true if all or part of the area to be covered is indoor space with walls where UHF technology may require a separate reader in each room.

The location systems can be used within the following exemplary business, commercial markets:

First responder teams, including fire, EMT, SWAT teams; Corrections facilities management; Airport and aircraft security; Port and maritime security; Physical infrastructure protection; Hospitals; Factories; Construction sites; Shopping malls; Schools; Office buildings; and Automotive.

There are at least two different ways the systems can be implemented for the markets listed above. The first are small groups of people that have no fixed infrastructure. For example, when a group of firefighters enter a burning building, the location system will be able to see the location of the firefighters in a building. The distance system by itself can be utilized without any triangulation techniques. For example, when prisoners are on work detail (outside the corrections facility), they are supervised by a corrections officer. The prisoners can be uniquely identified by the supervising officer on a visual interface. By measuring the distance of the supervised prisoners, the officer will be able to see the relative distance of all the prisoners at all times. In addition, any person or item can be tracked down by determining whether the person or item is closer or farther from the user based on whether the relative distance is increasing or decreasing. This can be used in multiple contexts. For example, for automotive applications, a car with the system will enable the user to predetermine the exact distance the car doors will automatically open when the owner approaches the car, or the car owner can use the system to find their car in a parking structure.

The second implementation is for a fixed type of campus-type settings that can consist of a mixture of buildings and outdoor environments. The system can be used for outdoor locations or indoor locations individually. The main differentiation between the first implementation is that in the second implementation there are fixed devices location throughout the buildings and outdoors. Typically, this type of installation will have many more tags deployed as part of the overall system. The system can be used to track doctors and patients in a hospital to inventory in a warehouse facility.

People lose or misplace things all of the time: keys, wallets, purses, cell phones, laptop computers, remote controls, etc. With the technology described herein, people can simultaneously keep track of multiple frequently lost objects, thereby eliminating both the time spent looking for misplaced items and the cost of replacing them when lost. In addition, the technology described herein can be used to allow users to view the exact location of all the people in their group, as well as quickly locate and track each other down when needed. This has specific uses for children when they are on field trips or with parents on trips.

A recent government mandate dubbed e911, requires all wireless companies be able to locate people who dial 911 from their cell phones. However, the technologies being used for e911 only narrow a caller's location down to within 100 meters for 67% of calls and within 300 meters for 95% of calls. The technology described herein could be combined with existing e911 technologies to provide a more accurate and comprehensive solution. By combining this system with GPS or other analogous technologies used for e911 location, the resulting integration will provide for a more reliable, complete and accurate solution, enabling the determination of both general global and exact relative location information. For example, search and rescue agencies could be notified of the approximate location of a 911 caller using current e911 technology. Upon arriving within one mile, the 911 caller's exact location can be identified, greatly enhancing the speed of rescue. Such integration will also enable any of the functionality described above.

The system can be seamlessly be integrated with a GPS receiver and provide location information within a network. Any unit with a sky view can be interfaced to accept standard GPS NEMA data allowing any system unit to act as a GPS reference point. Other units within the network will precisely know their relative location to the GPS reference point and calculate their own virtual GPS position. This system has the advantage to provide GPS-like precision in areas that do not have a view of the sky but are in radio range of master/slave units.

The system can also provide assisted cellular location information by interfacing with assisted GPS systems, base stations, Pico cells or EOTD cellular systems. The location techniques and algorithms are not necessarily cellular network-dependent. All cellular phones themselves within radio range of each other could potentially become part of the RTFL network and provide virtual GPS location to near by phone. If it is not possible to have any phone in radio range of the GPS sky, a master unit with known location can be substituted as a GPS reference. Since the system is ideally suited for VHF transmission, an alternate emergency channel outside of cellular channels could also be provided to allow communications and location information to another phone for 911 or other emergency communications.

Cell phones with technology described herein could provide short range relative location to any phone in radio range. This can be very useful to locate colleagues, friends or family in a store, where house, mall or anywhere people may wander off. Various algorithms could be implemented in a cellular radio and independently provide relative locations to members of a group without the need of GPS, base station, or external reference.

Two way radios typically form an independent radio network where the system can measure each member's relative location. Note that the ranging signals occupy a common narrow band FM communications channel. A communications protocol can be applied to facilitate communications and ranging information through time or frequency division, sub-carrier or pilot tone. Such a system would allow a group of radios to know each others' relative location or relative to a repeater or base station.

Another example is integrating techonology into Local Area Network systems (such as wireless routers). The system can be integrated into existing wireless routers, providing much greater location capability than the UHF based tracking implementation for routers.

While the described system itself is a narrowband ranging system, it can also be adapted to wideband transmissions such as video or high speed data. Such a system could be multiplexed in time or frequency to a video or data network or have a special channel, sub carrier or pilot tone for ranging.

Since the system uses DSP algorithms over analog channels, its ranging technology could be a part of the firmware of any radio or as a stand-alone DSP ranging technology to an analog, digital or software radio.

The different applications will determine the exact technical specifications (such as power, emissions, bandwidth). The invention allows operating on many different bandwidths, including the most stringent bandwidths, including 6.25 kHz, 11.25 kHz, 12.5 kHz, 25 kHz and 50 kHz set forth in the FCC and comply with the corresponding technical requirements for the appropriate sections. As a result, multiple FCC sections and exemptions within such sections will be applicable. For example, within 47 CFR Part 90—Private Land Mobile Radio Services, compliance with multiple subparts can be used to enable FCC compliant operation of our system. The two subparts deal with applications for public safety and industrial/business radio application. Within the public safety band, it is possible to operate at such bands (bands set forth in the Public Safety Pool Frequency Table) because the system is able operate on bandwidths such as 11.25 kHz. Within the Industrial/Business Radio Pool, the system is able to meet the requirements necessary to receive a license to operate at such bands (bands set forth in the Industrial/Business Pool Frequency Table) because it can operate on bandwidths such as 11.25 kHz.

Subpart F—Radiolocation Services can also be utilized. This subpart allows for spread spectrum and non-spread spectrum applications. As an example, for business applications, spread spectrum can be utilized as set forth in Section 90.103, Radiolocation services. Public Safety also allows the use of Spread Spectrum in 90.20(f) Public Safety Pool (see subpart 5). It is also important to note that the General Technical Standards require the use of bandwidths that are as narrow as 6.25 kHz, 12.5 kHz, 25 kHz and 50 kHz.

In addition, Section 90.217 has an exemption from technical standards that limits the output power to 120 miliwatts but limits the channel bandwidth to 25 kHz. The system can operate in full compliance with this section. In addition, Section 90.259 has a specific qualification for the Industrial/Business Pool for the use of Frequencies in the 216-220 MHz and 1427-1432 MHz. This allows the use of up to 50 kHz of contiguous channels.

Within 47 CFR Part 90—Private Land Mobile Radio Services, compliance with multiple subparts can be used to enable FCC compliant operation of the system. By way of example, Subpart A, General Mobile Radio Services, Subpart B, Family Radio Services, Subpart G, Low Power Radio Services, Subpart Multi-Use Radio Service can be used.

Within 47 CFR Part 15 Radio Frequency Devices, Subpart C-Intentional Radiators, can be used. This enables the devices to be used by all consumers.

Having thus described the different embodiments of a system and method, it should be apparent to those skilled in the art that certain advantages of the described method and apparatus have been achieved. In particular, it should be appreciated by those skilled in the art that a system for tracking and locating objects can be assembled using FGPA or ASIC and standard signal processing software/hardware combination at a very small incremental cost. Such a system is useful in a variety of applications, e.g. locating people in indoor or in outdoor environments, harsh and hostile environments etc.

It should also be appreciated that various modifications, adaptations, and alternative embodiments thereof may be made within the scope and spirit of the present invention. The invention is further defined by the following claims.

What is claimed is:

1. A system for RF-based tracking and locating objects, comprising:
    a Master Unit having an RF transceiver and adapted to interface to a Tag to measure distance to the Tag; and
    the Tag having an RF transceiver and adapted to interface to the Master Unit,
    wherein the RF transceiver of the Master Unit and the RF transceiver of the Tag are configured to transmit and receive a narrow bandwidth ranging signal in no higher than a VHF band,
    wherein the narrow bandwidth ranging signal includes multiple pulses at different frequencies, and
    wherein the narrow bandwidth ranging signal is used for measuring the distance between the Master Unit and the Tag.

2. The system of claim 1, wherein the Master Unit and the Tag operate in a half-duplex mode.

3. The system of claim 1, wherein the Master Unit and the Tag operate in a simplex mode.

4. The system of claim 1, wherein the narrow bandwidth ranging signal includes any of:
    an RX base-band ranging signal in no higher than the VHF band;
    an RX base-band voice signal in no higher than the VHF band; and
    an RX base-band data signal in no higher than the VHF band.

5. The system of claim 1, wherein the signal is processed using Digital Signal Processing (DSP) and Software-Defined Radio (SDR) technologies.

6. The system of claim 5, wherein signal processing includes noise reduction by any of methods:
    coherent summing;
    non-coherent summing;
    matched filtering;
    inter-pulse modulation;
    zero/pi modulation;
    dithering;
    Multipath reduction technology:
    Adaptive equalization—CMA (Constant Modulo Algorithm);
    DFE (Decision Feedback Equalization);
    Vitterbi algorithm;
    RF channel multipath (delay) identification using Multi-frequency characterization;
    Kalman estimation;
    Impulse compression;
    Spread Spectrum;
    TX and RX circuitry propagation delay measurement and estimation using Loop-back/self-test techniques.

7. The system of claim 1, wherein the distance between the Master Unit and the Tag is measured by:
    Differential Time of Arrival (DTOA).

8. The system of claim 1, wherein roles of the Master Unit and the Tag are reversed.

9. The system of claim 1, wherein the narrow bandwidth signal includes multiple pulses at the same frequency.

10. A system for RF-based tracking and locating objects, comprising:
    a plurality of Master Units each having an RF transceiver and each adapted to interface to a Tag to measure distances to the Tag from each Master Unit of the plurality of the Master Units; and
    the Tag having an RF transceiver and adopted to interface to the plurality of the Master Units,
    wherein the RF transceivers of the Master Units and the RF transceiver of the Tag are configured to transmit and receive a narrow bandwidth ranging signal in no higher than a VHF band,
    wherein the narrow bandwidth ranging signal includes multiple pulses at different frequencies, and
    wherein the narrow bandwidth ranging signal is used for measuring the distance between the Master Units and the Tag.

11. The system of claim 10, wherein the Master Units and the Tag transmit and receive the narrow bandwidth ranging signal within or below the VHF band.

12. The system of claim 10, wherein one of the Master Units operates in a single originating reader mode and the other Master Units operate in a satellite mode and some Master Units operate in Tag mode.

13. The system of claim 10, wherein the signal includes any of:
    an RX base-band ranging signal in no higher than the VHF band;
    an RX base-band voice signal in no higher than the VHF band; and
    an RX base-band data signal in no higher than the VHF band.

14. The system of claim 10, wherein the signal is processed using Digital Signal Processing (DSP) and Software-Defined Radio (SDR) technologies.

15. The system of claim 10, wherein each satellite Master Unit and Tag receives a first and second ranging signals sequences, the first ranging signal sequence being generated by the originating Master Unit and the second ranging signal sequence is re-transmitted by the Tag; and
    wherein each ranging signal sequence is processed separately to determine a time delay during distance measurement and each of the satellite Master Units calculates the time of flight for each of the ranging signals.

16. The system of claim 13, wherein the difference between the times of flight of the first and second ranging signals is used to determine position of the Tag relative to the Master Units; and
    wherein Master-Tag and Master-Master distance measurement is performed using
    Differential Time of Arrival (DTOA).

17. A method for RF-based tracking and locating objects, comprising:
    transmitting, by a Master Unit, and receiving, by a Tag, a narrow bandwidth signal;
    the Master Unit having an RF transceiver adapted to interface to the Tag and the Tag having an RF transceiver adopted to interface to the Master Unit; and wherein the RF transceiver of the Master Unit and the RF transceiver of the Tag are transmitting and receiving the narrow bandwidth ranging signal in no higher that a VHF bands to measure a distance between the Master Unit and the Tag, and wherein the narrow bandwidth ranging signal includes multiple pulses at different frequencies.

18. The method of claim 15, wherein the Master Unit and the Tag are transmitting and receiving the narrow bandwidth signal within and below VHF bands.

19. The method of claim 15, wherein the distance between the Master Unit and the Tag is measured by Differential Time of Arrival (DTOA).

* * * * *